E. T. JENKINS.
Process and Apparatus for the Production of Distillates.
No. 219,733. Patented Sept. 16, 1879.
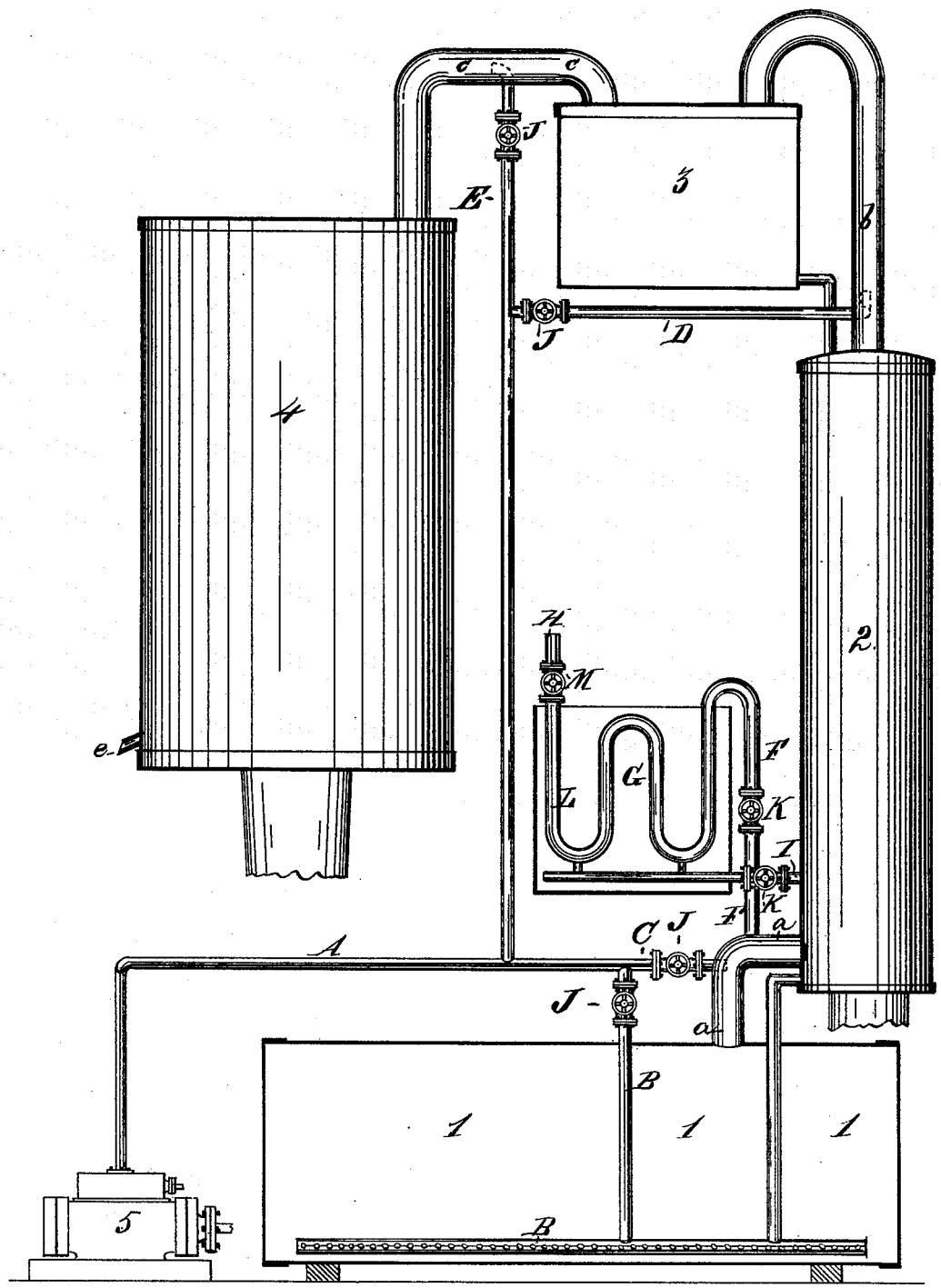

UNITED STATES PATENT OFFICE.

EDWARD T. JENKINS, OF BROOKLYN, NEW YORK.

IMPROVEMENT IN PROCESSES AND APPARATUS FOR THE PRODUCTION OF DISTILLATES.

Specification forming part of Letters Patent No. 219,733, dated September 16, 1879; application filed August 14, 1878.

*To all whom it may concern:*

Be it known that I, EDWARD T. JENKINS, of the city of Brooklyn, in the county of Kings and State of New York, have invented a new and useful Process and Apparatus for the Production of Distillates; and that the following is a full, clear, and exact description of the same, reference being had to the accompanying drawings.

My invention relates to that class of devices, means, and processes used to prevent or remove what is commonly called or known as "fusel-oil," and other substances having a deleterious effect on the taste or quality of alcoholic spirits or other distillates.

The first division of my invention consists in the process of injecting a flavoring vapor into the vapor of the distillate for imparting the desired flavor to said distillate.

My invention further consists in the application to a distilling apparatus of a supplementary condenser, by means of which the greater part of the foul gases and fetid matters can be eliminated at the commencement of the process of distillation, and the contamination of the distilling-column thereby prevented.

My invention further consists in the application to a distilling apparatus of an air-forcing apparatus with air-pipes, by means of which air may be forced into different parts of the distilling apparatus in quantities regulated at pleasure.

The supplementary condenser and the air-forcing apparatus and pipes are associated with various parts of the distilling apparatus in different combinations, more or less of which combinations may be used, as found expedient.

In order that the invention may be fully understood, I have represented in the accompanying drawings, and will proceed to describe, an apparatus for distilling alcoholic spirit which embodies my said combinations, and I will also describe the mode of distilling with the said apparatus.

The said drawing represents the apparatus partly in elevation and partly in section, so that its construction may be made clear.

In order that the heat may be applied to the liquid to be distilled, the latter is introduced into a still-body or still proper, 1, which may be of any suitable form, it being substantially a close vessel, which is heated either externally by a fire or by a steam-jacket, or internally by means of a steam-coil, or by injecting steam or hot air into the liquid to be distilled. This still is connected with the distilling-column 2, refrigerator 3, and condenser or worm 4, each of which may be of any approved construction, as the particular construction of each does not constitute any part of the invention.

In order that my invention may be embodied, there is provided an air-forcing pump, 5, or other apparatus capable of forcing atmospheric air into the distilling apparatus while in operation. The air forced out by this pump through its discharge-pipe A may be injected into different parts of the apparatus, as circumstances or the views of the distiller render expedient, and according as the apparatus contains more or less of my invention.

In order that air may be injected into the liquid, either to remove fetid matter therefrom or to facilitate the separation of the alcoholic spirit, an air-pipe, B B, is conducted from the discharge-pipe of the air-pump into the bottom of the still 1, and is there perforated with small holes, through which the air is distributed into the liquid.

In order that air may be introduced into the alcoholic spirit while it is in a state of vapor in the distilling-column, the air-pump 5 is combined with the vapor-pipe $a$, or neck of the still, leading into the interior of the distilling-column, through the intervention of an air-pipe, C.

In order that air may be made to act upon the alcoholic spirit while it is in the refrigerator 3, the air-pump is combined with the interior of the vapor-pipe $b$, leading to the refrigerator through the intervention of an air-pipe, D.

In order that the air may be made to act upon the alcoholic spirit in the worm or condenser 4, the air-pump is combined with the pipe $c$, leading to the worm, through the intervention of an air-pipe, E.

Each of the said air-pipes is provided with a stop cock or valve, J, by which it may be opened or closed, so that the quantity of air may be regulated.

The apparatus is further provided with a supplementary condenser, G, for the purpose of condensing the alcoholic spirit without conducting it through the distilling-column, as this course is expedient at the commencement of the distillation of each fresh charge of liquid in the still-body. This supplementary condenser contains a worm, L, which is connected with the neck a of the still by a pipe, F, for vapor, and with the distilling-column 2 by a pipe, I, for the delivery of the condensed liquor into said column.

The outer end, H, of the worm L is provided with an air-cock, M, so that foul air, gases, or vapors may be permitted to escape. The worm of this supplementary condenser may be connected with the air-pump by a special air-pipe; but as the worm receives the vapor from the neck of the still beyond the entrance of the air-pipe C, a special air-pipe for the worm of the condenser is unnecessary. Stop-cocks K K are provided to open and close the connecting-pipes F I.

The operation of apparatus constructed as above set forth is as follows: The mash or other liquid to be distilled is introduced into the still-body, and is heated to the distilling temperature, as usual. When it arrives at that temperature air is injected into the apparatus by the action of the air-forcing apparatus or pump, and the quantity of air and the place of its introduction depend upon the views of the distiller, and may be determined for each particular kind of liquid by experiment.

The air introduced at any part of the distilling apparatus when in regular operation passes through the same and escapes at the discharge-aperture e, which, in the present case, is the nozzle from which the alcoholic spirit in liquid form is permitted to escape.

I prefer in all cases to introduce some air into the liquid in the still, as its action therein facilitates the evaporation, and also the elimination of fetid matter from the liquid.

When the operation of distillation is commenced, the stop cocks or valves connecting the supplementary condenser with the rest of the apparatus are opened, and also the air-cock M, more or less, and it is then easier for the vapors to pass to the supplementary condenser than to make their way through the distilling-column. The foul gases and fetid matter rising from the liquid in the still-body pass to the supplementary condenser, where the alcoholic spirit is condensed, while the greater part of the fetid matter is permitted to escape with the air at the air-cock M.

Condensation in the supplementary condenser is continued until the greater part or the whole of the fetid matter is eliminated, after which the connecting-cocks between the supplementary condenser and the rest of the apparatus are closed, and the alcoholic vapors pass to the distilling-column and the succeeding members of the apparatus.

In case the alcoholic spirit is to be flavored or aromatized, the flavoring-extract may be introduced by the action of the air by causing the air to pass through a vaporizer or evaporator of the extract. Such a vaporizer may consist of a close vessel containing lamp-wick or other material presenting a large evaporating-surface, and the flavoring-extract may be introduced into said evaporator.

The position of the vaporizer or evaporator depends upon the views of the distiller, who may have it arranged on the air-pipe B, that supplies the still 1, or upon one of those that supplies air to other parts of the apparatus. I prefer to apply the evaporator of the flavoring-extract to the air-pipe E, which supplies air to the condenser 4, so that the vapors of the flavoring-extract and alcoholic spirit mingle and are condensed simultaneously.

In place of a vapor some gas which will give flavor to the alcoholic spirit may be employed, and in place of atmospheric air some other gas which will remove deleterious substances from the alcoholic spirit may be injected by means of the air-forcing apparatus.

The apparatus for injecting the atmospheric air may be of any approved construction. If it be a reciprocating apparatus, it should be supplied with an air-vessel, so as to equalize the flow of air more or less.

If deemed expedient, the air may be heated before being injected by causing it to pass through pipes to the exterior of which heat is applied, and the heat may be imparted by means of a liquid in which the heating-pipes are immersed. Thus the air may be caused to pass through a coil of pipe immersed in the liquid in the still itself, so that the heat of the air at the time of its injection approximates that of the liquid in the still.

I have found by experiment that in the distillation of alcoholic spirit the greater part of the fetid matters which pollute the spirit may be driven off during the first stage of the distillation. By the use of a supplementary condenser the spirit may then be condensed without passing the fetid gases or vapors into the distilling-column, and the fetid gases or vapors may be permitted to escape. Consequently the distilling-column and the succeeding members of the apparatus and the spirit that remains in them from preceding operations need not be polluted with the fetid matter. After the fetid matter, or the greater part of it, is eliminated, the distillation by the use of the distilling-column may proceed in the ordinary way. By operating in this manner the proportion of the distillate obtained from each charge of liquid that requires to be redistilled is materially reduced, and the introduction of air into the liquid in the still both favors the elimination of the fetid matter and facilitates the evaporation of the alcoholic spirit, while the introduction of air into the other parts of the apparatus tends to carry the alcoholic vapors onward, and to oxidize whatever matter is susceptible to this action.

The invention is applicable to other distillates than alcohol, and may be used as found expedient.

My invention is applicable, in whole or in part, to any form of still, and I have furnished a drawing of one of the most complicated in order to show how the connections may be conveniently made for embodying every part of the second division of my invention. Parts of that division of the invention may be used in simpler forms of still, in which case fewer air-connections will be required.

I claim as my invention—

1. The process for producing a flavored distilled liquor, substantially as before set forth, which consists in distilling the distillable liquid by heat, injecting a flavoring vapor into the vapor of the distillate, and simultaneously condensing the said vapors.

2. The combination, substantially as before set forth, of the still-body, the distilling-column, the supplementary condenser-worm having an air-cock, and the pipes and cocks which connect the worm with the still-body and the column.

3. The combination, substantially as before set forth, of the still-body, the distilling-column, the supplementary condenser, the air-pipe for introducing air into the still-body, and the air-forcing apparatus.

4. The combination, substantially as before set forth, of the still-body, the distilling-column, the refrigerator, the air-pipe for introducing air into the refrigerator, and the air-forcing apparatus.

5. The combination, substantially as before set forth, of the still-body, the distilling-column, the refrigerator, the condenser, the air-pipe for introducing air into the condenser, and the air-forcing apparatus.

Witness my hand this 5th day of September, A. D. 1878.

EDWARD THOMAS JENKINS.

Witnesses:
W. L. BENNEM,
STEPHEN A. POWELL.